US011407360B1

(12) United States Patent
Huang

(10) Patent No.: US 11,407,360 B1
(45) Date of Patent: Aug. 9, 2022

(54) BLIND SPOT WARNING AND TURN SIGNAL INDICATION LIGHT-EMITTING DEVICE FOR VEHICLE SIDE VIEW MIRROR

(71) Applicant: Mei-Hui Huang, Tainan (TW)

(72) Inventor: Mei-Hui Huang, Tainan (TW)

( * ) Notice: Subject to any disclaimer, the term of this patent is extended or adjusted under 35 U.S.C. 154(b) by 0 days.

(21) Appl. No.: 17/511,774

(22) Filed: Oct. 27, 2021

(30) Foreign Application Priority Data

Aug. 31, 2021 (TW) .................................. 110210282

(51) Int. Cl.
| | |
|---|---|
| B60R 1/12 | (2006.01) |
| B60Q 9/00 | (2006.01) |
| B60Q 1/34 | (2006.01) |
| B60R 1/06 | (2006.01) |
| F21S 43/14 | (2018.01) |
| F21S 43/239 | (2018.01) |
| F21S 43/247 | (2018.01) |
| F21V 8/00 | (2006.01) |
| F21S 43/245 | (2018.01) |
| F21W 103/25 | (2018.01) |
| F21Y 115/10 | (2016.01) |

(52) U.S. Cl.
CPC .............. B60R 1/1207 (2013.01); B60Q 1/34 (2013.01); B60Q 9/008 (2013.01); F21S 43/14 (2018.01); F21S 43/239 (2018.01); F21S 43/245 (2018.01); F21S 43/247 (2018.01); G02B 6/0016 (2013.01); G02B 6/0036 (2013.01); *B60R 1/06* (2013.01); *F21W 2103/25* (2018.01); *F21Y 2115/10* (2016.08)

(58) Field of Classification Search
CPC ...... B60R 2001/1223; B60R 2001/215; B60R 1/1207; F21S 43/239
See application file for complete search history.

(56) References Cited

U.S. PATENT DOCUMENTS

| | | | |
|---|---|---|---|
| 7,771,062 B2 | 8/2010 | Kuhn et al. | |
| 10,589,675 B1 * | 3/2020 | Huang | ................. F21S 43/239 |
| 2004/0161222 A1 | 8/2004 | Niida et al. | |
| 2010/0182143 A1 * | 7/2010 | Lynam | .................. B60R 1/1207 340/465 |
| 2012/0147613 A1 * | 6/2012 | Goldschmidt | ....... G02B 6/0001 362/494 |
| 2012/0206930 A1 * | 8/2012 | Minikey, Jr. | .............. B60R 1/12 362/494 |
| 2020/0215985 A1 * | 7/2020 | Lynam | .................. B60R 1/0602 |
| 2020/0223365 A1 * | 7/2020 | Oh | ............................ F21V 7/28 |

* cited by examiner

*Primary Examiner* — Eric T Eide
(74) *Attorney, Agent, or Firm* — Alan D. Kamrath; Karin L. Williams; Mayer & Williams PC

(57) ABSTRACT

A blind spot warning and turn signal indication light-emitting device for a vehicle side view mirror includes a mirror seat, a blind spot warning unit and a turn signal indication unit both mounted on the mirror seat. The blind spot warning unit includes a light guiding member having a light incident face aligned with a light emitting diode lamp and provided with a plurality of grooves to diffuse light emitted by the light emitting diode lamp. The turn signal indication unit includes a turn signal light guide having a light incident surface aligned with light emitting elements and provided with a plurality of troughs to diffuse light emitted by the light emitting elements. The turn signal light guide further includes an operating surface having reflective surfaces to reflect the diffused light to uniformly pass outwardly through a mirror of the vehicle side view mirror.

5 Claims, 10 Drawing Sheets

BLIND SPOT WARNING AND TURN SIGNAL INDICATION LIGHT-EMITTING DEVICE FOR VEHICLE SIDE VIEW MIRROR

BACKGROUND OF THE INVENTION

1. Field of the Invention

The present invention relates to a vehicle side view mirror and, more particularly, to a blind spot warning and turn signal indication light-emitting device incorporated in the side view mirror to provide uniform, bright, alarming light, reminding a driver of incoming vehicles at the side of the vehicle and alerting other drivers and another person when the vehicle is turning or making a lane change.

2. Description of the Related Art

Side view mirrors provided on two sides of a vehicle permit the driver of the vehicle to be aware of the road conditions on two sides of the vehicle, such that the driver can be alerted for proper responses before or during changing the lane. However, the driver cannot see vehicles in the blind spots at two sides of the vehicle. In an approach, an alarming device in the form of a lighting element, such as an LED lamp, is mounted in a housing of each side view mirror and is electrically connected to one of two sensors respectively mounted to two ends of a tail of the vehicle. A mirror of each side view mirror includes a light transmittable section aligned with one of the lighting elements. When one of the two sensors detects the presence of a vehicle in the blind spot or blind zone at a side of the vehicle, the associated lighting element is activated to emit light beams to alert the driver of the vehicle in the blind spot or blind zone. However, the light beams emitted from the lighting element could dazzle the eyes of the driver and could cause accidents. Furthermore, it is known to provide a turn signal indication device in the side view mirror of a vehicle. When a driver of the vehicle intends to turn or change a lane to switch on the direction indicator lamp of the vehicle, the turn signal indication device is activated, so that an illuminated turn signal indication is displayed in the mirror of the side view mirror to alert other drivers and pedestrians near the vehicle light. However, the light emitted by the turn signal indication device is also very dazzling, which may irritate the driver's eyes and negatively affect driving safety. If diffusing agents are added into the alarming device and/or the turn signal indication device to homogenize the light beams, the manufacturing costs are significantly increased.

BRIEF SUMMARY OF THE INVENTION

Thus, an objective of the present invention is to provide a blind spot warning and turn signal indication light-emitting device for a vehicle side view mirror, which is installed in the side view mirror of the vehicle and can respectively generate uniform and bright blind spot warning display and turn signal indication display (direction-indicating pattern) on the mirror of the side view mirror, avoiding the excessively strong light of the lighting element from irritating the driver's eyes.

To achieve this and other objectives, a blind spot warning and turn signal indication light-emitting device for a vehicle side view mirror of the present invention includes a mirror seat, a blind spot warning unit and a turn signal indication unit. The mirror seat is mounted in a housing of the vehicle side view mirror and includes a first surface and a second surface spaced from the first surface in a length direction. The mirror seat further includes a first positioning section having a first window extending from the first surface through the second surface. The mirror seat further includes a second positioning section having a second window extending from the first surface through the second surface. The mirror seat is provided with a mirror bonded to the second surface of the mirror seat and having spaced first and second light transmitting areas. The first and second light transmitting areas are respectively aligned with the first and second windows. The blind spot warning unit includes a light guiding member and a cover mounted around the light guiding member and received in the first window of the mirror seat. A light emitting diode lamp is mounted in the cover. The light guiding member includes a light output face, an operating face spaced from the light output face in the length direction, and a light incident face extending between the light output face and the operating face. The light incident face includes a plurality of grooves, and the operating face includes a plurality of recesses defining a plurality of reflective faces. The light output face of the light guiding member is aligned with the first light transmitting area of the mirror, and the light incident face of the light guiding member is aligned with the light emitting diode lamp. When the light emitting diode lamp is activated to emit light, the plurality of grooves diffuses light emitted by the light emitting diode lamp, and the plurality of reflective faces reflects the diffused light to uniformly pass outwardly through the light output face. The turn signal indication unit includes a turn signal light guide made of a light transmitting material and a turn signal cover mounted around the turn signal light guide and received in the second window of the mirror seat. The turn signal light guide includes a light output surface, an operating surface spaced from the light output surface in the length direction, and a light incident surface extending between the light output surface and the operating surface. The light incident surface includes a plurality of troughs, and the operating surface of the turn signal light guide includes a plurality of recessed portions defining a plurality of reflective surfaces. Each of the plurality of reflective surfaces is at an acute angle to the light output surface. The light output surface is aligned with the second light transmitting areas of the mirror. A circuit board is mounted in the turn signal cover and provided with at least one light-emitting element which is aligned with the light incident surface of the turn signal light guide. When the light-emitting element is activated to emit light, the plurality of troughs diffuses light emitted by the light-emitting element, and the plurality of reflective surfaces reflects the diffused light to uniformly pass outwardly through the light output surface and the second light transmitting area of the mirror.

In an embodiment, the turn signal cover includes a first face, a second face spaced from the first face in the length direction, and an outer periphery extending between the first face and the second face and received in the second window of the mirror seat. The circuit board of the turn signal indication unit is installed between the outer periphery of the cover and the light incident surface of the turn signal light guide.

In an embodiment, the turn signal light guide further includes an end surface extending between the light output surface and the operating surface and spaced from the light incident surface in a lateral direction perpendicular to the length direction. The light incident surface has a length in the length direction larger than a length of the end surface in the length direction.

In an embodiment, the turn signal light guide further includes a first side and a second side spaced from the first side in a vertical direction perpendicular to the length direction and the lateral direction, with the plurality of recessed portions extending from the first side through the second side of the turn signal light guide.

Preferably, the acute angle is in a range between 260 and 45°.

In a preferred embodiment, each of the plurality of grooves of the light incident surface has two sides, and a width between two sides of each of the plurality of troughs ranges from 0.5 mm to 2 mm.

In an embodiment, a board is bonded to the light output surface and includes a plurality of holes aligned with the second light transmitting areas of the mirror, so that the light emitted from the light output surface exits through the holes of the board.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
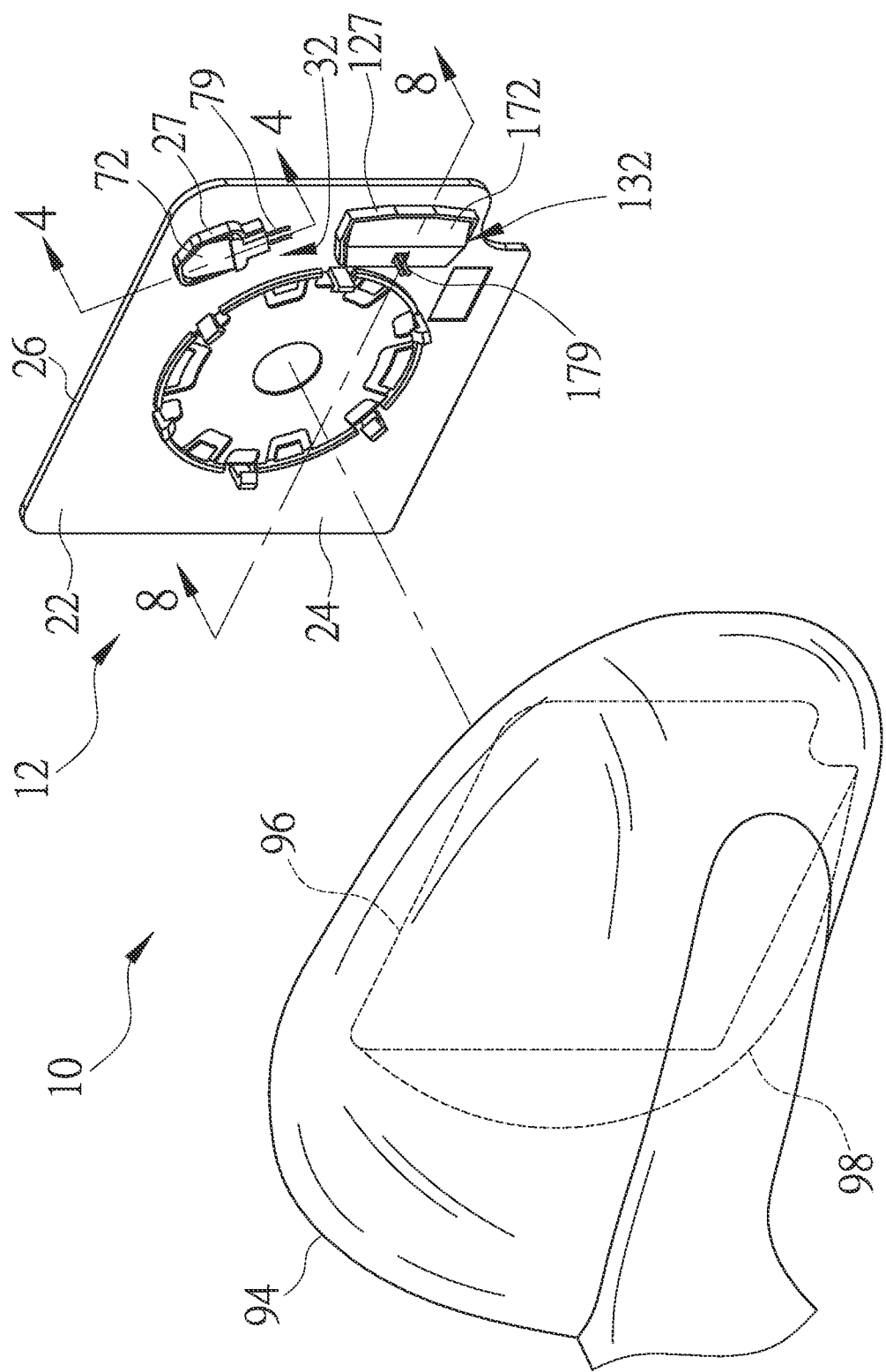
FIG. 1 is an exploded, perspective view of a vehicle side view mirror having a blind spot warning and turn signal indication light-emitting device of an embodiment according to the present invention.
Figure 2:
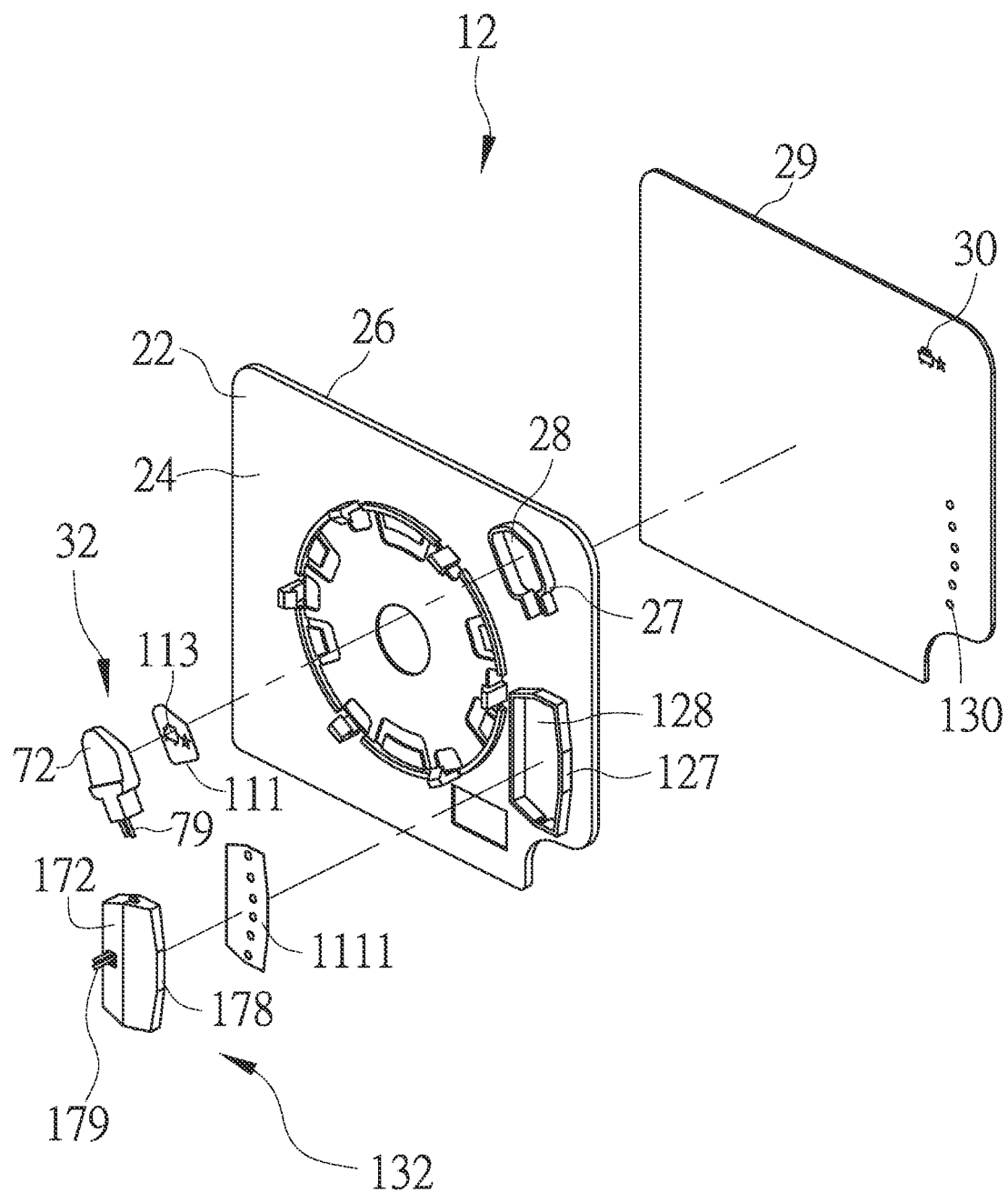
FIG. 2 is an exploded, perspective view of the blind spot warning and turn signal indication light-emitting device of FIG. 1.

With reference to FIGS. 1-5, a blind spot warning and turn signal indication light-emitting device 12 according to an embodiment of the present invention is mounted in a housing 94 of a vehicle side view mirror 10. The housing 94 has an opening 96 in a surface thereof and a compartment 98 recessed inward from the opening 96 into the housing 94. The blind spot warning and turn signal indication light-emitting device 12 includes a mirror seat 22, a blind spot warning light-emitting device or blind spot warning unit 32, and a direction-indicating light-emitting unit or turn signal indication unit 132.

Figure 4:
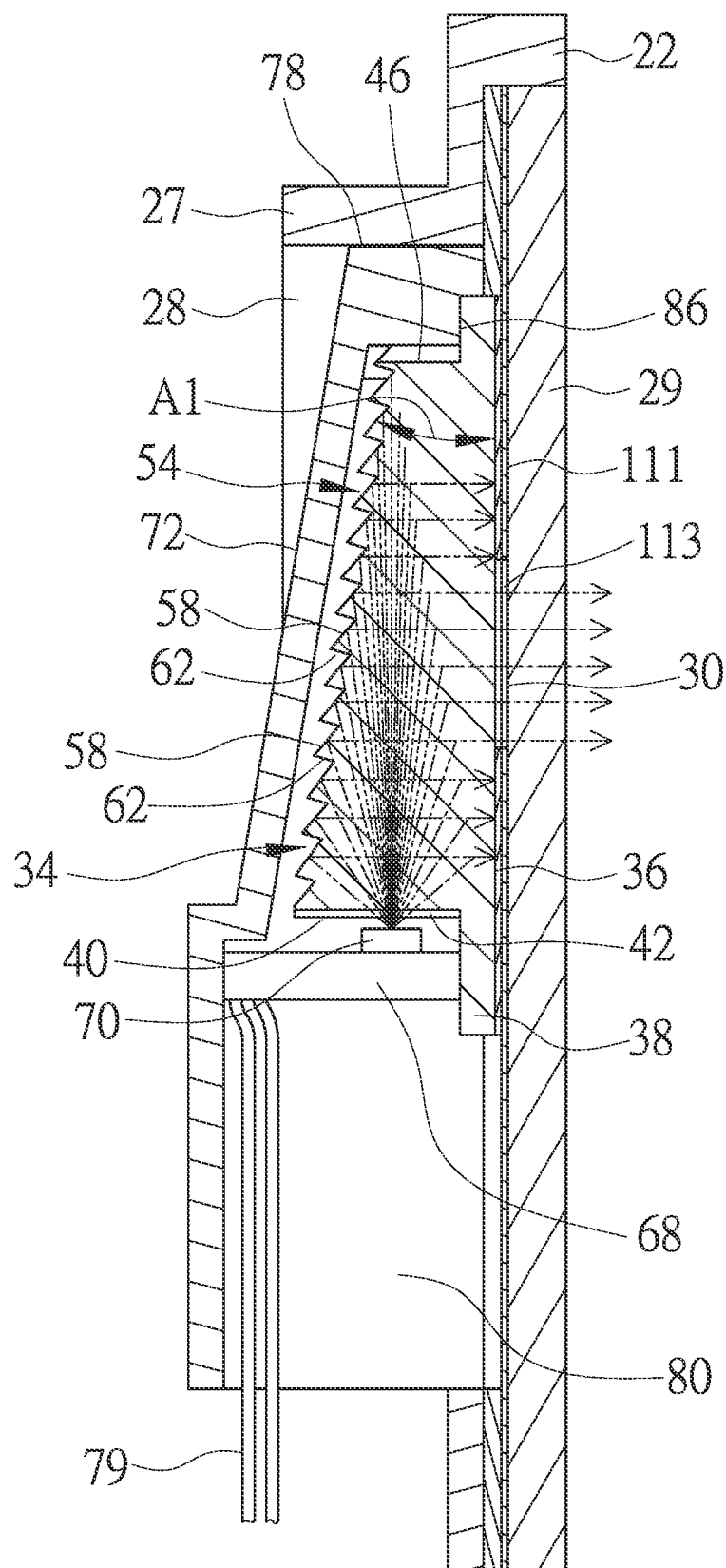
FIG. 4 is a cross sectional view taken along section line 4-4 of FIG. 1.
Figure 5:
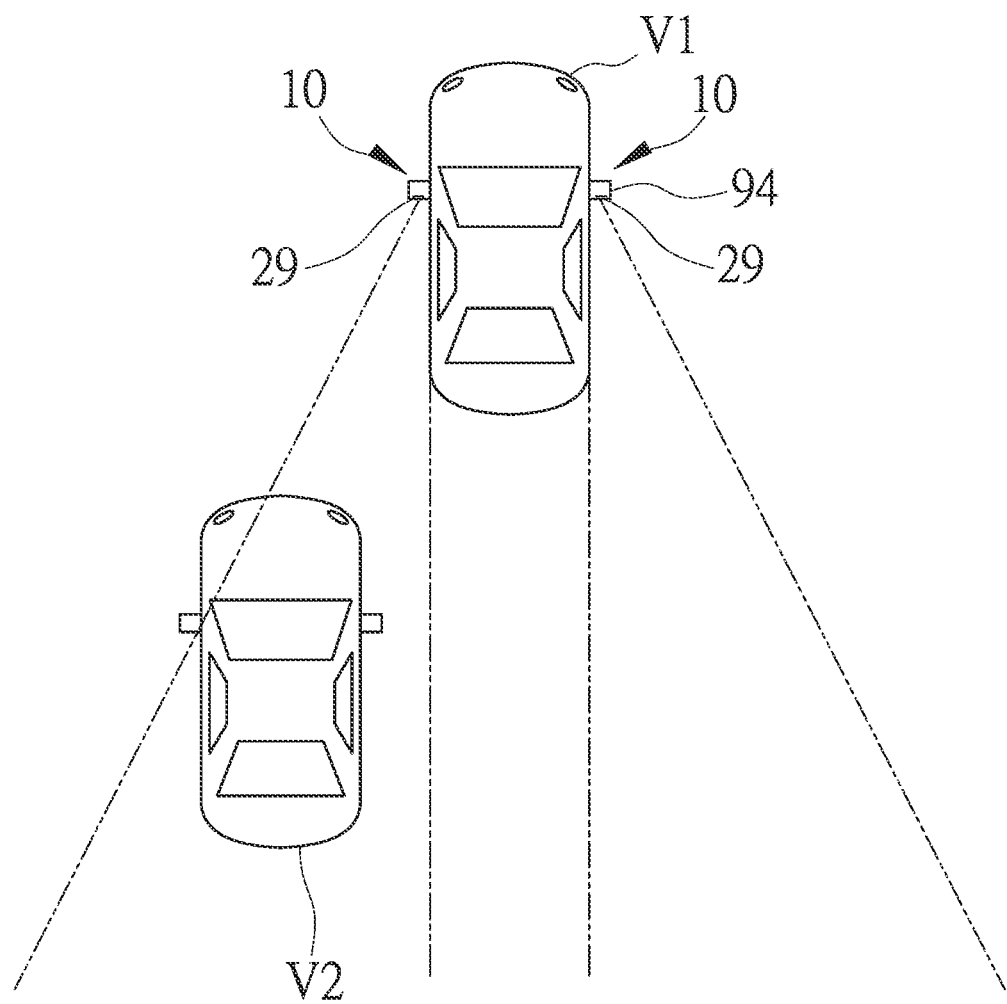
FIG. 5 is a schematic view of a vehicle with the blind spot warning and turn signal indication light-emitting devices, illustrating that the sensor of the vehicle detects the presence of an incoming vehicle in the blind spot.
Figure 6:
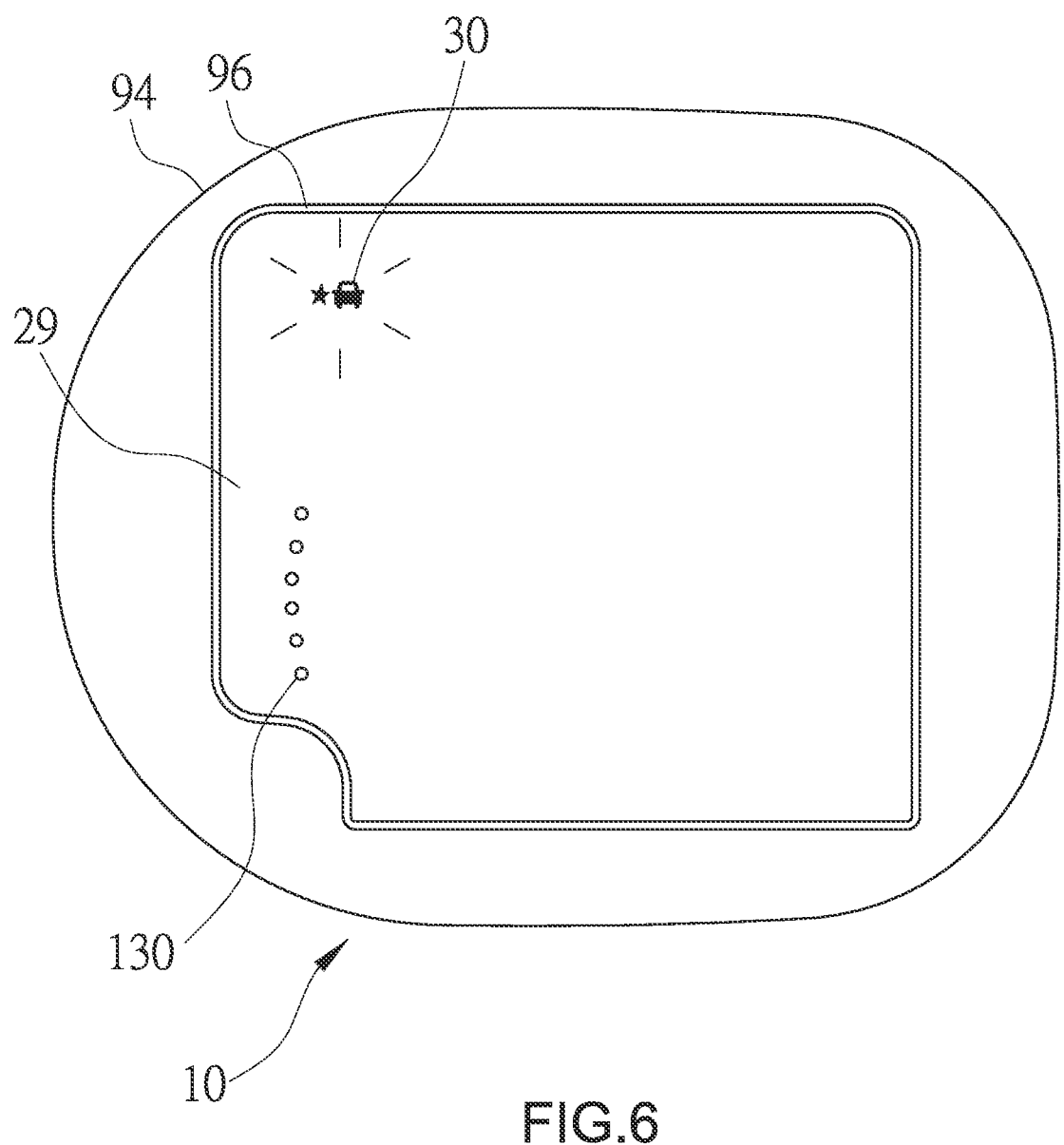
FIG. 6 is a schematic view of a side view mirror of the vehicle of FIG. 5, illustrating an illuminated warning pattern generated on a mirror of the side view mirror.
Figure 8:
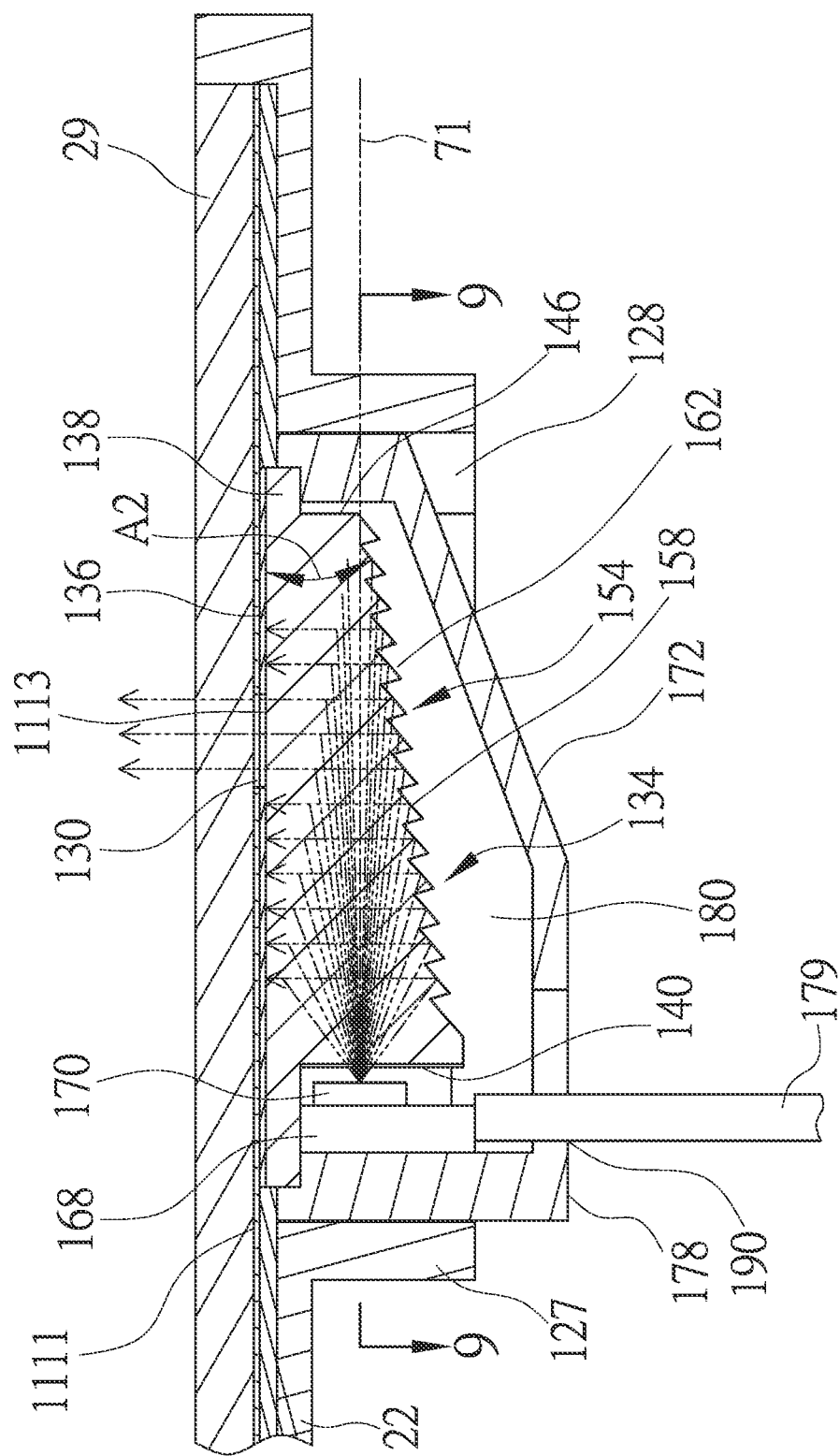
FIG. 8 is a cross sectional view taken along section line 8-8 of FIG. 1.

The mirror seat 22 includes a first surface 24 and a second surface 26 spaced from the first surface 24 in a length direction. The mirror seat 22 further includes a first positioning section 27 having a first window 28 extending from the first surface 24 through the second surface 26. The first window 28 receives the blind spot warning unit 32. The mirror seat 22 further includes a second positioning section 127 spaced from the first positioning section 27 and having a second window 128 extending from the first surface 24 through the second surface 26. The second window 128 receives the turn signal indication unit 132. The mirror seat 22 is provided with a mirror 29 having spaced first and second light transmitting areas 30, 130. The mirror 29 is bonded to the second surface 26 of the mirror seat 22 with the first and second light transmitting areas 30, 130 aligned with the first and second windows 28, 128 (FIG. 4 and FIG. 8). The mirror seat 22 is placed into the housing 94 with the first surface 24 facing the opening 96 and is securely mounted in the compartment 98 of the housing 94. The mirror 29 is located in the opening 96 of the housing 94 (FIG. 6).

Figure 3:
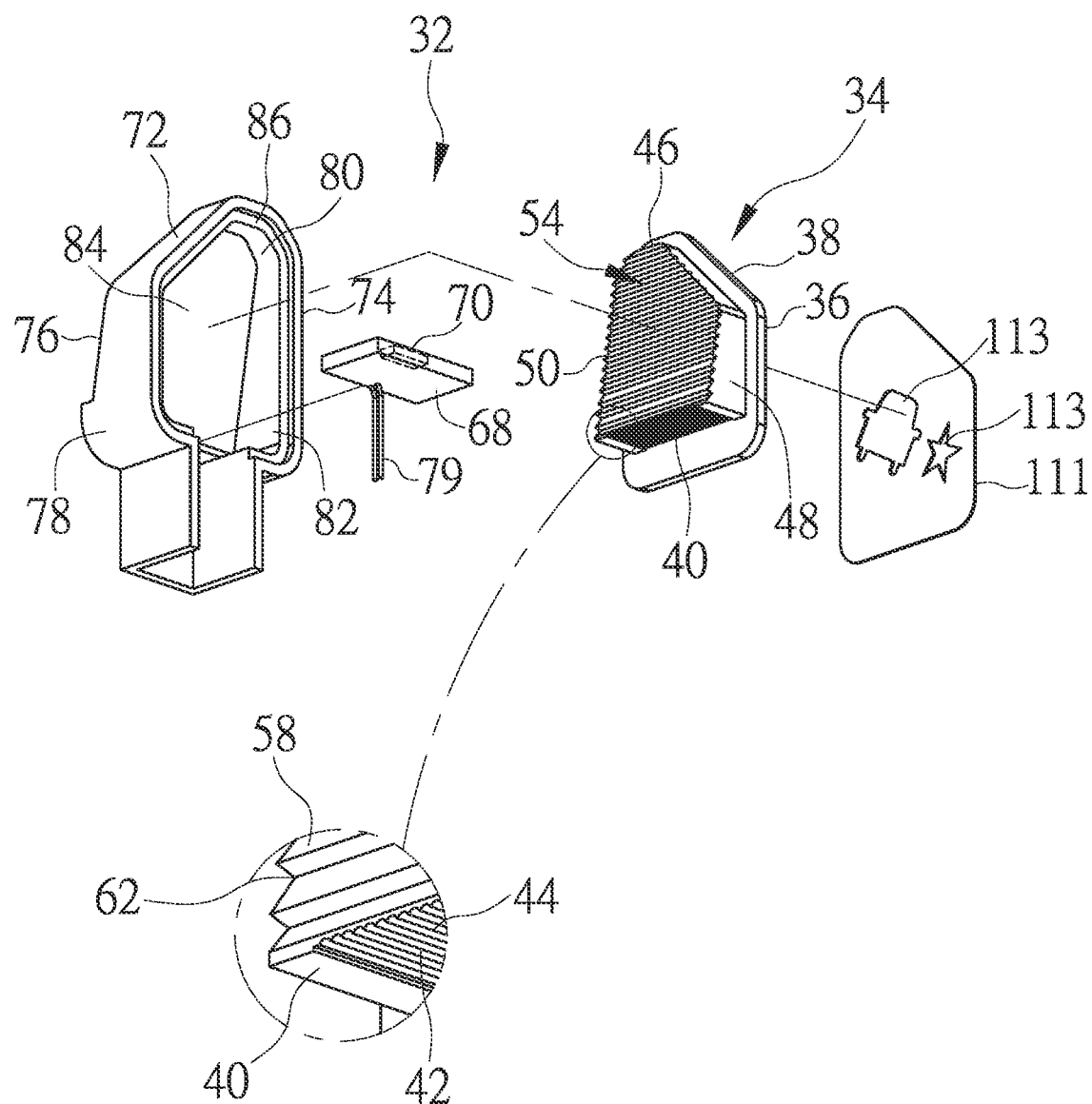
FIG. 3 is an exploded, perspective view of a blind spot warning unit of FIG. 2.

The blind spot warning unit 32 generally has a structure utilizing aspects of the blind spot area warning and illustrating device 32 described in U.S. Pat. No. 10,589,675 B1, the entire content of which is incorporated herein by reference. With reference to FIGS. 3 and 4, the blind spot warning unit 32 includes a light guiding member 34 made of a light transmitting material and a cover 72 mounted around the light guiding member 34. A circuit board 68 is mounted in the cover 72 and electrically connected to a sensor mounted to a side of the vehicle. The circuit board 68 includes a light emitting diode (LED) lamp 70. The light guiding member 34 includes a light output face 36, an operating face 54 spaced from the light output face 36 in the length direction, a light incident face 40 extending between the light output face 36 and the operating face 54, and an end face 46 extending between the light output face 36 and the operating face 54 and spaced from the light incident face 40 in a vertical direction perpendicular to the length direction. The light guiding member 34 further includes a first lateral side 48 extending between the light output face 36 and the operating face 54 and between the light incident face 40 and the end face 46. The light guiding member 34 further includes a second lateral side 50 extending between the light output face 36 and the operating face 54, extending between the light incident face 40 and the end face 46, and spaced from the first lateral side 48 in a lateral direction perpendicular to the length direction and the vertical direction. A positioning portion 38 is formed along a periphery of the light output face 36. The light incident face 40 has a length in the length direction larger than a length of the end face 46 in the length direction. The operating face 54 gradually inclines from the light incident face 40 towards the light output face 36 in the vertical direction. Thus, the light guiding member 34 is substantially a wedge-shaped member when viewed from the lateral side (see FIG. 4). The light output face 36 of the light guiding member 34 is configured to be aligned with the first light transmitting area 30 of the mirror 29. The light incident face 40 includes a plurality of grooves 42. Each of the plurality of grooves 42 has two sides 44, and two adjacent grooves 42 share a same side 44. The operating face 54 includes a plurality of recesses 62 which are substantially perpendicular to each of the grooves 42 and define a plurality of reflective faces 58 extending from the first lateral side 48 through the second lateral side 50. Each of the plurality of reflective faces 58 extends in the lateral direction and is at an acute angle A1 to the light output face 36 (FIG. 4). The acute angle A1 is in a range between 26° and 45°, preferably between 310 and 40°. In this embodiment, a first board 111 is bonded to the light output face 36 and includes at least one first hole 113 which is aligned with the first light transmitting areas 30 of the mirror 29.

The cover 72 is a housing through which light cannot transmit. The cover 72 includes a first surface 74, a second surface 76 spaced from the first surface 74 in the length direction, and an outer periphery 78 extending between the first surface 74 and the second surface 76. The outer periphery 78 of the cover 72 has a shape identical to the first window 28 of the mirror seat 22. A chamber 80 is recessed into the first surface 74 and receives the light guiding member 34. The chamber 80 includes a bottom face 84 and an inner periphery 82 extending perpendicularly from a periphery of the bottom face 84. An insertion groove 86 is formed between the first surface 74 and the inner periphery 82. The light guiding member 34 extends into the chamber 80 of the cover 72, and the positioning portion 38 of the light guiding member 34 is received in the insertion groove 86, so that the cover 72 is mounted around the light guiding member 34. The LED lamp 70 is aligned with the light incident face 40 of the light guiding member 34, so that the light outputted by the LED lamp 70 extends in the vertical direction from the light incident face 40, and the light beams of the light from the LED lamp 70 cover one or more of the plurality of grooves 42. Furthermore, with the light output face 36 of the light guiding member 34 facing the first window 28 of the mirror seat 22, the light guiding member 34 is inserted until the outer periphery 78 of the cover 72 is press-fit in the first window 28 for positioning purposes. Furthermore, the sensor mounted to the side of the vehicle can be connected by a wire 79 extending into the chamber 80 for electrical connection with the circuit board 68.

When the sensor mounted to the side of the vehicle V1 detects the presence of an incoming vehicle V2 in the blind spot (FIG. 5), the LED lamp 70 of the side view mirror 10 is activated to emit light incident to the plurality of grooves 42 of the light incident face 40. One or more of the plurality of grooves 42 diffuse the light into the light guiding member 34. Then, the plurality of reflective faces 58 reflects the light towards the light output face 36 by total internal reflection (FIG. 4). Thus, the uniformly diffused and reflected light exits via the holes 113 of the board 111 and the first light transmitting area 30 of the mirror 29 and generate an illuminated warming pattern on the mirror 29 (FIG. 6). Accordingly, the blind spot warning unit 32 can generate uniform, bright, alarming light on the side view mirror 10, protecting the eyes of the driver from dazzling light from the LED lamp 70.

Figure 7:
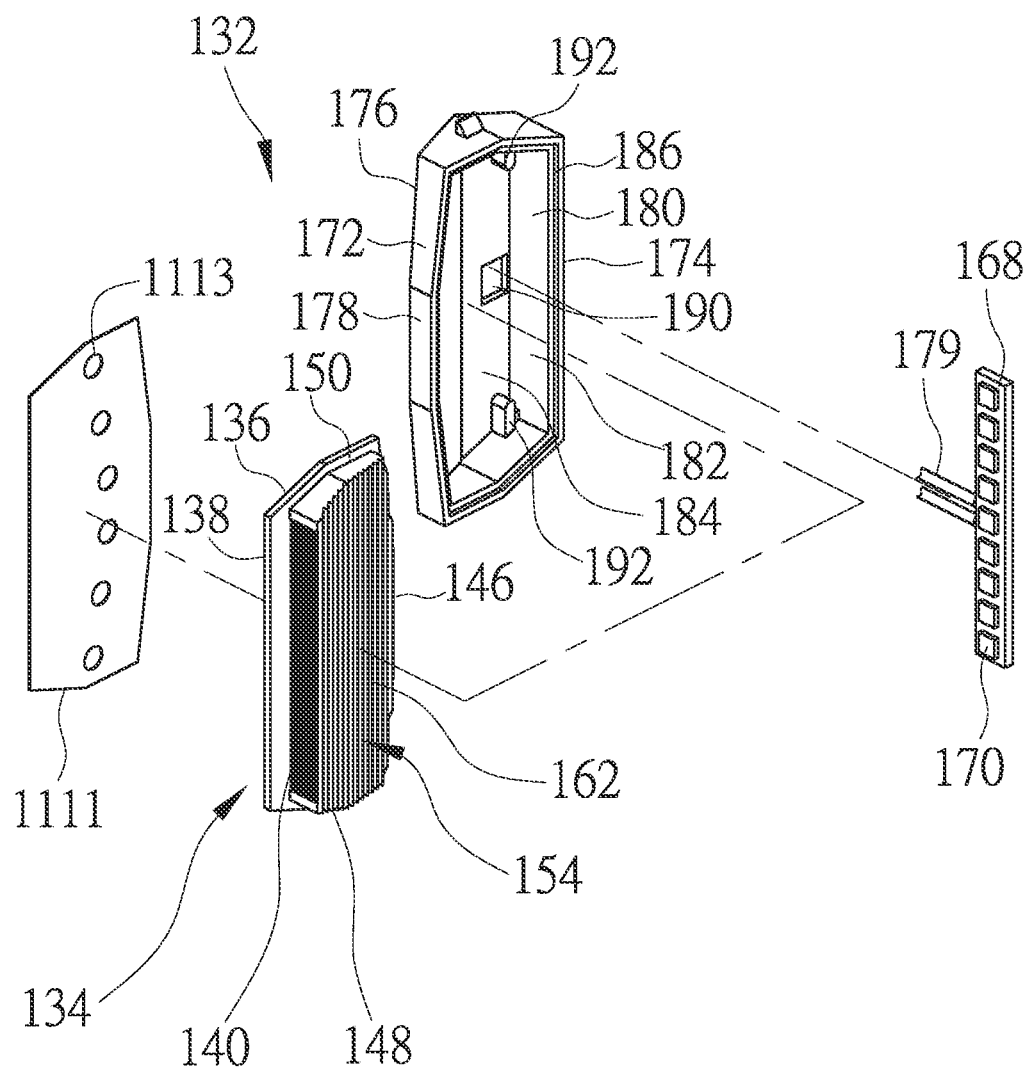
FIG. 7 shows an exploded, perspective view of a turn signal indication unit of FIG. 2.

With reference to FIGS. 1, 7 and 8, the turn signal indication unit 132 includes a turn signal light guide 134 made of a light transmitting material and a turn signal cover 172 mounted around the turn signal light guide 134. The turn signal light guide 134 includes a light output surface 136, an operating surface 154 spaced from the light output surface 136 in the length direction, a light incident surface 140 extending between the light output surface 136 and the operating surface 154, and an end surface 146 extending between the light output surface 136 and the operating surface 154 and spaced from the light incident surface 140 in the lateral direction. The turn signal light guide 134 further includes a first side 148 extending between the light output surface 136 and the operating surface 154 and between the light incident surface 140 and the end surface 146. The turn signal light guide 134 further includes a second side 150 extending between the light output surface 136 and the operating surface 154, extending between the light incident surface 140 and the end surface 146, and spaced from the first side 148 in the vertical direction. A positioning portion 138 is formed along a periphery of the light output surface 136. The light incident surface 140 has a length in the length direction larger than a length of the end surface 146 in the length direction. The operating surface 154 gradually inclines from the light incident surface 140 towards the light output surface 136 in the lateral direction. Thus, the turn signal light guide 134 is substantially a wedge-shaped member when viewed from the vertical side (FIG. 8).

The light incident surface 140 includes a plurality of troughs 142. Each of the plurality of troughs 142 has two sides 144 (FIG. 9), and two adjacent troughs 142 share a same side 144. The width between two sides 144 of each of the plurality of troughs 142 ranges from 0.5 mm to 2 mm. Furthermore, each of the plurality of troughs 142 has a depth from a bottom thereof to the light incident surface 140, and the depth is between 0.5 mm and 2 mm. The operating surface 154 of the turn signal light guide 134 includes a plurality of recessed portions 162 extending from the first side 148 through the second side 150 and defining a plurality of reflective surfaces 158 extending from the first side 148 through the second side 150 (FIG. 8). Each of the plurality of reflective surfaces 158 extends in the vertical direction and is at an acute angle A2 to the light output surface 136. The acute angle A2 is in a range between 26° and 45°, preferably between 31° and 40°. In an example, the acute angle A2 between the light output surface 136 and a first one of the plurality of reflective surfaces 158 proximate to the light incident surface 140 is 31°. The acute angle A2 between one of the plurality of reflective surfaces 158 and the light output surface 136 is larger than the acute angle A2 between the light output surface 136 and another of the plurality of reflective surfaces 158 next to the one of the plurality of reflective surfaces 158 in the lateral direction towards the light incident surface 140 by an angle between 0.5° and 10. The acute angle A2 between the light output surface 136 and a last one of the plurality of reflective surfaces 158 proximate to the end surface 146 is 40°. In this embodiment, a second board 1111 is bonded to the light output surface 136 and includes at least one second hole 1113 which is aligned with the second light transmitting areas 130 of the mirror 29.

With reference to FIG. 7, the turn signal cover 172 is a housing through which light cannot transmit. The turn signal cover 172 includes a first face 174, a second surface 176 spaced from the first face 174 in the length direction, and an outer periphery 178 extending between the first face 174 and the second surface 176. The outer periphery 178 of the turn signal cover 172 has a shape identical to the second window 128 of the mirror seat 22. A chamber 180 is recessed into the first face 174 and receives the turn signal light guide 134. The chamber 180 includes a bottom surface 184 and an inner periphery 182 extending perpendicularly from a periphery of the bottom surface 184. An insertion groove 186 is formed between the first face 174 and the inner periphery 182. The bottom surface 184 is a matte surface. A through-hole 190 extends through the bottom surface 184 to communicate with the chamber 180.

A circuit board 168 is mounted in the turn signal cover 172 and provided with one or more light-emitting elements (such as light-emitting diodes) 170. Two positioning blocks 192 are provided in the chamber 80 and adjacent to the bottom surface 184 to position the circuit board 168. In this embodiment, the circuit board 168 is installed between the outer periphery 178 of the turn signal cover 172 and the light incident surface 140 of the turn signal light guide 134 and is electrically connected to a control system of the vehicle V1 by a wire 179, so that the light-emitting element 170 can emit light in response to a switch-on of a corresponding direction indicator lamp of the vehicle. With reference to FIG. 8, an optical axis 171 of the light outputted by the light-emitting element 170 on the circuit board 168 has directivity. The beam angle of the light-emitting element 170 is between 10° and 120°, and preferably between 40° and 80°.

Figure 9:
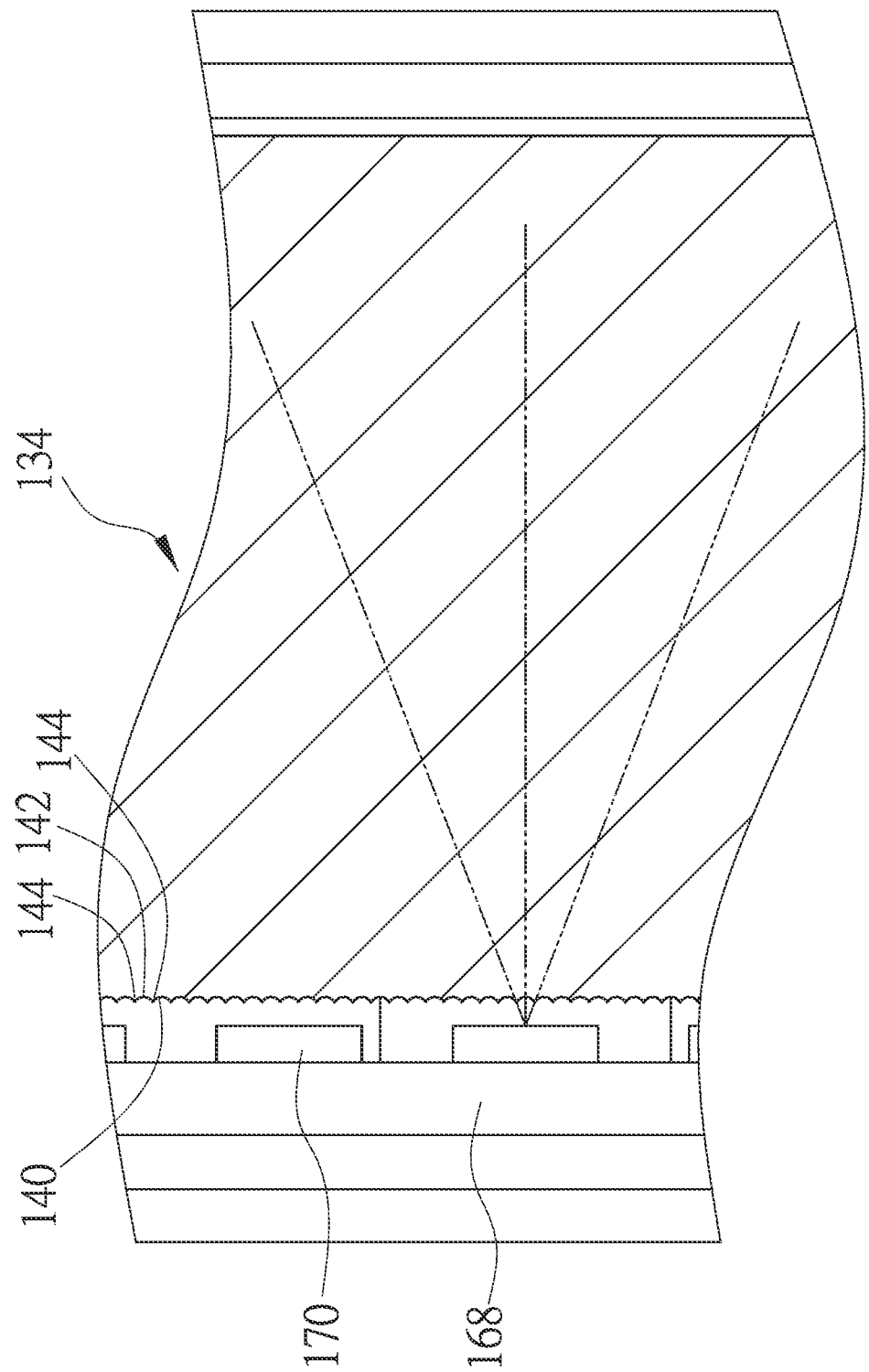
FIG. 9 is a cross sectional view taken along section line 9-9 of FIG. 8, illustrating diffusion of light beams from a light-emitting element.

With reference to FIGS. 7-9, in assembly, the turn signal light guide 134 extends into the chamber 180 of the turn signal cover 172, and the positioning portion 138 of the turn signal light guide 134 is received in the insertion groove 186, so that the turn signal cover 172 is mounted around the turn signal light guide 134. The light-emitting element 170 is aligned with the light incident surface 140 of the turn signal light guide 134, so that the light outputted by the light-emitting element 170 extends in the lateral direction from the light incident surface 140, and the light beams of the light from the light-emitting element 170 cover one or more of the plurality of troughs 142. Furthermore, with the light output surface 136 of the turn signal light guide 134 facing the second window 128 of the mirror seat 22, the turn signal light guide 134 is inserted until the outer periphery 178 of the turn signal cover 172 is press-fit in the second window 128 for positioning purposes.

Figure 10:
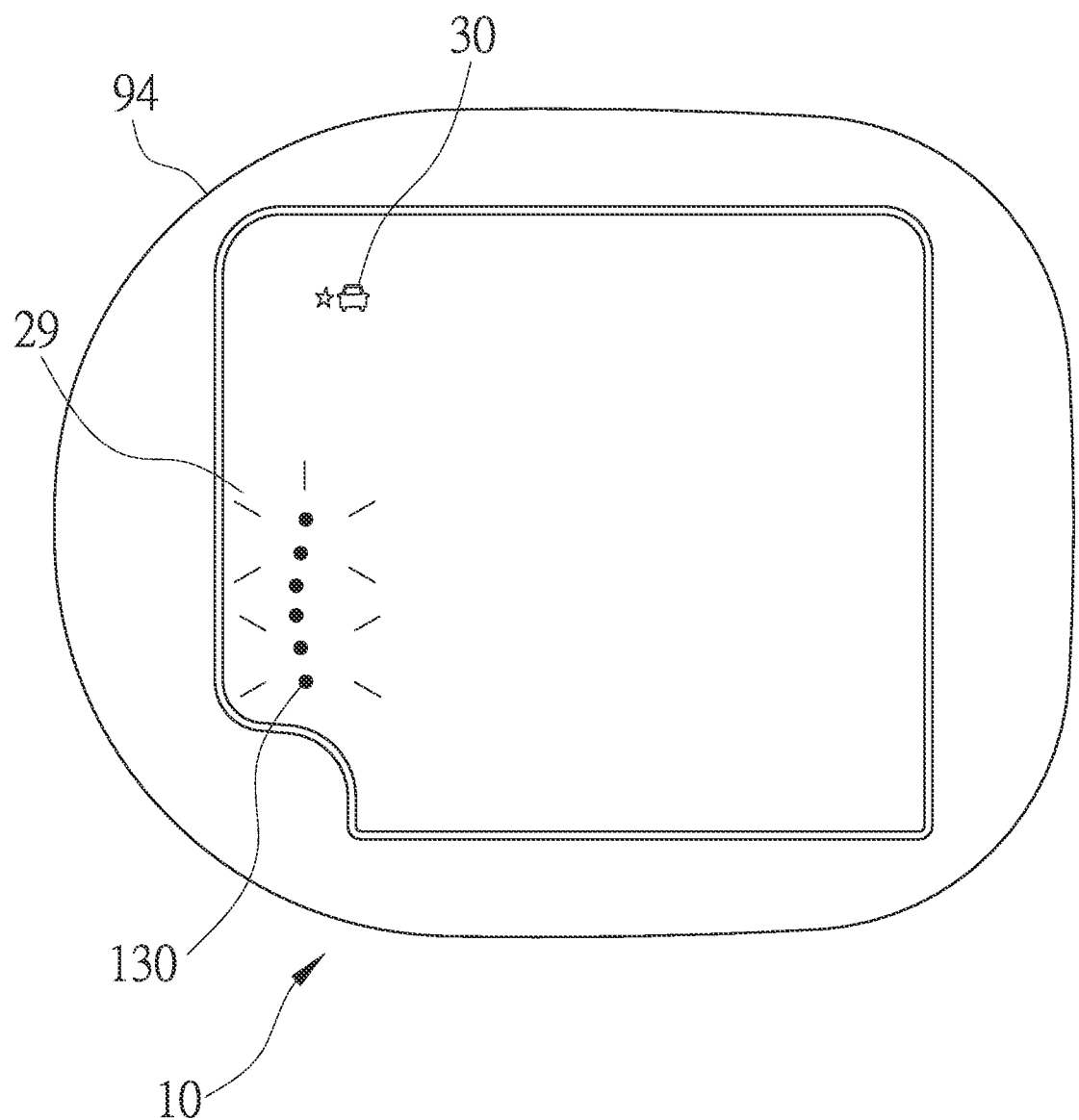
FIG. 10 is a schematic view similar to FIG. 6, illustrating an illuminated turn signal indication pattern generated on the mirror of the side view mirror.

In practice, when the driver of the vehicle V1 intends to turn or change a lane and activates direction indicator lamps of the vehicle, the turn signal indication unit 132 on the same side as the direction indicator lamps will be activated synchronously to cause the light-emitting element 170 to emit light incident to the plurality of troughs 142 of the light incident surface 140. One or more of the plurality of troughs 142 diffuse the light into the turn signal light guide 134. Then, the plurality of reflective surfaces 158 reflects the light towards the light output surface 136 by total internal reflection (FIG. 8). Thus, the uniformly diffused and reflected light exits via the second holes 1113 of the second board 1111 and the second light transmitting area 130 of the mirror 29 and generate an illuminated turn signal indication pattern on the mirror 29 (FIG. 10). Accordingly, the turn signal indication unit 132 can generate uniform, bright, alarming light on the side view mirror 10, protecting the eyes of the driver from dazzling light from the light-emitting elements 170. In this embodiment, a plurality of second holes 1113 arranged in dots is provided in the second board 1111, and the light-transmitting graphic display of the second holes 1113 can form a conspicuous turn signal indication to remind other vehicles or pedestrians around the vehicle.

In summary, the blind spot warning and turn signal indication light-emitting device 12 according to the present invention is configured with a blind spot warning unit 32 and a turn signal indication unit 132. When the sensor mounted to the side of the vehicle V1 detects the presence of an incoming vehicle V2 in the blind spot, the blind spot warning unit 32 is activated to generate uniform, bright, alarming light on the mirror 29 of the side view mirror 10 (FIG. 6). In addition, when the direction indicator lamp of the vehicle is turned on, the turn signal indication unit 132 will synchronously generate uniform, bright, alarming light on the mirror 29 of the side view mirror 10 (FIG. 10). According to this, the driver of the vehicle and other vehicle drivers are provided with alarming and turn signal indication effects by uniform, bright, visual light without adding diffusing agents into the light guiding member 34 as well as the turn signal light guide 134 and without increasing the manufacturing costs.

Now that the basic teachings of the present invention have been explained, many extensions and variations will be obvious to one having ordinary skill in the art. For example, the light incident surface 140 of the turn signal light guide 134 may be spaced from the end surface 146 in the vertical direction.

The scope of the present disclosure is to be indicated by the appended claims, rather than by the foregoing description, and all changes which come within the meaning and range of equivalency of the claims are intended to be embraced therein.

The invention claimed is:

1. A blind spot warning and turn signal indication light-emitting device for a vehicle side view mirror comprising:
   a mirror seat mounted in a housing of the vehicle side view mirror and including a first surface and a second surface spaced from the first surface in a length direction, wherein the mirror seat further includes a first positioning section having a first window extending from the first surface through the second surface, with the mirror seat further including a second positioning section having a second window extending from the first surface through the second surface, wherein the mirror seat is provided with a mirror bonded to the second surface of the mirror seat and having spaced first and second light transmitting areas, wherein the first and second light transmitting areas are aligned with the first and second windows, respectively;
   a blind spot warning unit including a light guiding member and a cover mounted around the light guiding member and received in the first window of the mirror seat, with a light emitting diode lamp mounted in the cover, wherein the light guiding member includes a light output face, an operating face spaced from the light output face in the length direction, and a light incident face extending between the light output face and the operating face, wherein the light incident face includes a plurality of grooves, and the operating face includes a plurality of recesses defining a plurality of reflective faces, wherein the light output face of the light guiding member is aligned with the first light transmitting area of the mirror, and the light incident face of the light guiding member is aligned with the light emitting diode lamp, wherein when the light emitting diode lamp is activated to emit light, the plurality of grooves diffuses light emitted by the light emitting diode lamp, and the plurality of reflective faces reflects the diffused light to uniformly pass outwardly through the light output face and the first light transmitting area of the mirror;
   a turn signal indication unit including a turn signal light guide made of a light transmitting material and a turn signal cover mounted around the turn signal light guide and received in the second window of the mirror seat, wherein the turn signal light guide includes a light output surface, an operating surface spaced from the light output surface in the length direction, and a light incident surface extending between the light output surface and the operating surface, wherein the light incident surface includes a plurality of troughs, and the operating surface of the turn signal light guide includes a plurality of recessed portions defining a plurality of reflective surfaces, wherein each of the plurality of reflective surfaces is at an acute angle to the light output surface, wherein the light output surface is aligned with the second light transmitting areas of the mirror, wherein a circuit board is mounted in the turn signal cover and provided with at least one light-emitting element which is aligned with the light incident surface of the turn signal light guide, wherein when the light-emitting element is activated to emit light, the plurality of troughs diffuses light emitted by the light-emitting element, and the plurality of reflective surfaces reflects the diffused light to uniformly pass outwardly through the light output surface and the second light transmitting area of the mirror;

wherein the turn signal light guide further includes an end surface extending between the light output surface and the operating surface and spaced from the light incident surface in a lateral direction perpendicular to the length direction, wherein the light incident surface has a length in the length direction larger than a length of the end surface in the length direction; and wherein the turn signal light guide further includes a first side and a second side spaced from the first side in a vertical direction perpendicular to the length direction and the lateral direction, with the plurality of recessed portions extending from the first side through the second side of the turn signal light guide.

2. The blind spot warning and turn signal indication light-emitting device as claimed in claim 1, wherein the turn signal cover includes a first face, a second face spaced from the first face in the length direction, and an outer periphery extending between the first face and the second face and received in the second window of the mirror seat, wherein the circuit board of the turn signal indication unit is installed between the outer periphery of the turn signal cover and the light incident surface of the turn signal light guide.

3. The blind spot warning and turn signal indication light-emitting device as claimed in claim 1, wherein the acute angle is in a range between 260 and 45°.

4. The blind spot warning and turn signal indication light-emitting device as claimed in claim 1, wherein each of the plurality of troughs of the light incident surface has two sides, and a width between two sides of each of the plurality of troughs ranges from 0.5 mm to 2 mm.

5. The blind spot warning and turn signal indication light-emitting device as claimed in claim 1, wherein a board is bonded to the light output surface and includes a plurality of holes aligned with the second light transmitting areas of the mirror, so that the light emitted from the light output surface exits through the plurality of holes of the board.

\* \* \* \* \*